UNITED STATES PATENT OFFICE 2,374,602

TEXTILE PRINTING EMULSIONS AND METHOD OF PREPARING THEM

Roy Herman Kienle, Bound Brook, and Alfred Louis Peiker, East Bound Brook, N. J., assignors to American Cyanamid Company, New York, N. Y., a corporation of Maine No Drawing. Application January 9, 1941, Serial No. 373,796

9 Claims. (Cl. 260—29)

This invention relates to compositions for use in textile printing and methods of producing such compositions.

The printing of textiles by means of emulsions has attained great importance because by these printing inks it is possible to obtain sharp prints on textiles without undue bridging from fiber to fiber, and hence no excessive stiffness of the printed textile is observed. Emulsions which are either of the oil-in-water or water-in-oil type can be used. In the former a pigmented dispersion of a common film-forming material, preferably a synthetic resin in an organic solvent is the dispersed phase and water a continuous phase, and in the second type the reverse is true. While both types of emulsions are effective on prints, the water-in-oil type of emulsion permits further practical advantages where it is desired to sell a pigmented base composition that can be readily emulsified by the textile printer.

The present invention relates to compositions of the latter type, that is to say, water-in-oil, and to base compositions or intermediate products which can be used in preparing such emulsions.

It has been proposed to prepare water-in-oil emulsions by dissolving or dispersing synthetic resins with or without plasticizers in an organic solvent containing large amounts of aromatic compounds, such solvents being petroleum fractions rich in aromatics or solvents obtained from coal tar or other sources. It is possible to prepare emulsions with aromatic solvents which will give sharp prints and this was considered to be the standard procedure. According to the present invention, we have found that if a solvent is used for the oil base which is predominantly non-aromatic, that is to say, aliphatic or alicyclic, improved prints of certain types are made possible which with equal pigmentation are much stronger and considerably brighter. The reason for the improved results obtained has not been completely determined, and the present invention is not intended to be limited to any theory of action. However, we believe that at least one factor is the decreased penetration obtained with the emulsions of the present invention. The print appears to be more on the surface of the fabric and sharper line and solid object prints are obtained. On the other hand, with extremely shallow fine gradation prints, such as ombré, there is less penetration and the print appears less solid.

The emulsions of the present invention may be prepared in the form of finished emulsions, but it is an important advantage of the present invention that it is not necessary to prepare finished emulsions which would require the marketing of the product containing a considerable amount of water. On the contrary, the present invention may be applied to the production of the pigmented emulsion base containing little or no water which can be stored practically indefinitely and can be rapidly emulsified by the printer to form printing pastes of various strengths. It is a further advantage of the present invention that pastes thus prepared can be diluted by using suitable uncolored reducing emulsions so that different strengths of pigmentation can be obtained without departing from the desired consistency of the emulsion.

The present invention is applicable to any suitable film-forming compounds, such as alkyd resins, amino plastics of the urea and triazine type rendered sufficiently soluble in organic solvents, cellulose ethers, cellulose esters, natural resins, and the like. In fact, it is an advantage of the present invention that the technique and the field of choice of the emulsion printer is not narrowed by the use of the present invention and the stronger and brighter prints which can be obtained are enjoyed without the sacrifice of other desirable characteristics.

While the invention is not limited to any particular film-forming substances, it should be understood that the resins chosen must be suitable for emulsion printing. In this respect the present invention does not differ from the less strong and less brilliant water-in-oil emulsions which are a standard article.

In some prior proposals, water-in-oil printing emulsions have been prepared by carefully choosing organic solvents and film-forming substances which will form a clear true solution, that is to say, the oil phase is homogeneous except for the pigment which may be dispersed therein. It was thought that a homogeneous oil phase was essential to good emulsion prints. We have found that this is not the case, and while the present invention does not preclude the production of emulsions in which the oil phase is homogeneous, excellent results are obtained with oil phases which are not homogeneous and which are not true lacquers. In fact, some of the best results are obtained with such compositions. An essentially non-homogeneous oil phase which is frequently obtained with the predominantly aliphatic and alicyclic hydrocarbon solvents used in the present invention may be one of the reasons for enhanced strength and brilliancy of the prints, but this factor has not been determined definitely and it is possible that other factors play a part. We prefer, however, for best results to use a resin and solvent combination which will produce a non-homogeneous oil phase.

It is an advantage of the present invention that it can be used with various features of known printing emulsions. Thus, for example, the combination of cellulose ethers in small amounts with other resins, for example, oil-modified alkyd resins, and the like which has proven to be of advantage in emulsion printing generally, is equally advantageous with the compositions of the present invention. The use of elastomers in conjunction with the resins such as for example milled rubber or other polymerized elastomers is included in the present invention. These elastomers can be used with the same advantage with the solvents of the present invention and such modifications of the basic invention are included.

All of the advantages of emulsion printing are retained and just as with non-emulsions, the quality of prints will differ very largely with the nature of the resin and to some extent with the nature of the pigment. It is well known that different film-forming substances will give different degrees of wash fastness, resistance to crocking, and the like. The same is true in the compositions of the present invention and where best results are desired in order to produce a high degree of wash fastness, resins should be used which can be readily, rapidly and thoroughly cured to produce strong flexible discontinuous films. For other uses where extreme wash fastness is not necessary other film-forming ingredients can be used such as cellulose derivatives, natural resins, and the like, which are not cured to form insoluble substances.

The invention will be described in greater detail in conjunction with the following examples, but it is not to be limited to the details therein set forth.

*Example 1*

A pigmented base is prepared as follows:

41.75 parts of a mixture of resins, solvents and plasticizers containing 40.1 parts of a heat-converting, fatty acid modified alkyd resin having a so-called oil length of 50, 8.0 parts of low viscosity ethyl cellulose, 4 parts of dibutyl phthalate, 5.2 parts of butanol and 42.7 parts of a petroleum fraction with a boiling range of 160 to 250° C. which contains about 16% aromatic, the remainder being predominantly paraffinic and naphthenic hydrocarbons, are placed on a 3 roller ink mill together with 9.5 parts of Indanthrene Blue RS (C. I. 1106). After thorough grinding, this mixture is then blended with 16.75 parts of a 50% solution of butylated dimethylol urea in a solvent mixture consisting of equal parts of butanol and xylene, and an additional 17.5 parts of the petroleum fraction described above.

The pigmented base is then made into a water-in-oil emulsion in the following manner: 90 parts of the pigmented base are thoroughly mixed with 2 parts of morpholine oleate which has been dissolved in 42 parts of a petroleum fraction with a boiling range of 160-250° C., containing about 16% aromatic, the remainder being paraffinic and naphthenic hydrocarbons, and then 66 parts of water are added slowly while the entire mixture is under vigorous and intimate stirring.

Printing pastes in the ratios of 1:1, 1:3, 1:6, and 1:12 are then made, using a so-called reducing emulsion which is prepared in the following manner: 172 parts of a 60% solution of the heat converting resin described earlier in this example in a petroleum solvent whose boiling range is 135–175° C. and which contains 90 to 95% aromatic hydrocarbons are mixed with 200 parts of a 50% solution of butylated dimethylol urea dissolved in equal parts of butanol and xylene. 16 parts of morpholine oleate which has been dissolved in 200 parts of the petroleum fraction boiling between 160–250° C. and which contains about 16% aromatic hydrocarbon, the remainder being predominantly paraffinic and naphthenic in nature, is then added, followed by the slow addition of 1,012 parts of water. Care is taken that the blending of the various ingredients is carried out under vigorous stirring conditions. A stirrer of the homogenizing type is necessary. When all the above ingredients are thoroughly incorporated, the emulsion is given an additional half hour stirring to insure complete homogeneity. 150 parts of this unpigmented resin emulsion is now taken and mixed with 50 parts of the petroleum fraction, boiling between 160° C. and 250° C. and which contains about 16% aromatic hydrocarbons. Then 300 parts of water are slowly added under the same vigorous stirring conditions previously described. A smooth, creamy reducing emulsion results. The printing pastes prepared by blending the color emulsion and reducing emulsion in the ratio given are then applied to cotton fabrics from an engraved copper roll and dried.

When the prints obtained from the printing pastes described above are compared with prints obtained from printing pastes which are prepared in a manner similar to that described in the previous paragraph but with this difference, the emulsion from which the second group of pastes are made contains as a solvent a petroleum hydrocarbon with a boiling range of 135–175° C. and which is composed of 90% to 95% aromatic hydrocarbons in place of the petroleum fraction with the low aromatic content, it is found that the prints made from the emulsion described in this example are much stronger and somewhat brighter than corresponding prints made with petroleum solvent of high aromatic content.

*Example 2*

637 parts of a mixture of polymers is prepared, the composition of which follows: 185 parts of low viscosity ethyl cellulose solution consisting of 134 parts of ethyl cellulose dissolved in 288 parts of a petroleum fraction with a boiling range of 160–250° C. predominantly paraffinic and naphthenic in nature with less than 20% aromatic hydrocarbons and 72 parts of butanol, is blended with 418 parts of a solution of an alkyd resin prepared by dissolving 300 parts of a heat converting fatty acid modified alkyd having an oil length of 50 in 160 parts of the petroleum solvent described above and 40 parts of butanol. This blend of polymers is mixed with 120 parts of copper phthalocyanine (a blue pigment) and 60 parts of an inert white pigment with little or no hiding or covering power, then ground together on a grinding tool, such as a 3-roller ink mill to insure fine and uniform pigmentation. The milled pigmented base is then blended with 30 parts of tricresyl phosphate, 277 parts of a 50% solution of butylated dimethylol urea in equal parts of butanol and xylene, 263 parts of petroleum solvents described previously in this example, and 263 parts of a solvent whose boiling range is 135–175° C. and whose aromatic content is at least 90%.

This pigmented base is then made into a water-in-oil emulsion suitable for printing from an engraved copper roller in the following manner: 40 parts of the pigmented base is thoroughly mixed with 100 parts of a milled rubber solution, whose composition follows: 300 parts of a milled rubber solution containing 32 parts of milled rubber, and 288 parts of a hydrocarbon solvent having a boiling range of 135-175° C. and an aromatic content of at least 90%, are mixed with 165 parts of turpentine and 1520 parts of a petroleum solvent whose boiling range is 150° to 207° C. and which contains less than 25% aromatic hydrocarbons. To the mixture of pigmented base and rubber solutions described above a dilute acetic acid solution composed of 5.6 parts of glacial acetic acid, dissolved in 134.4 parts of water is added very slowly while the mixture is undergoing vigorous and intimate stirring. This mixture gives a so-called six "light" printing paste. Other strength printing pastes are prepared in much the same manner except that the quantities of base, rubber solution, water and acetic acid must be varied in order to produce the desired viscosity as well as the desired strength prints.

When the reduced color pastes are printed on cotton or cellulosic fabrics from an engraved roller or plate, clean, bright, greenish-blue prints are obtained.

If the prints described above are compared with prints made from printing pastes which are prepared in the same way and from the same pigmented base, but where the solvent used in the preparation of the milled rubber solution is a petroleum fraction boiling between 135-175° C. and which contains 90% to 95% aromatic hydrocarbons instead of the solvent used in Example 2, the former prints are definitely stronger and brighter.

*Example 3*

128 parts of the polymer mixture described fully as the first step in Example 2 are placed on a 3-roller ink mill along with 6 parts of tricresyl phosphate, 30 parts of an orange pigment prepared by tetrazotizing benzidine base and coupling on to phenyl methyl pyrazolone and 15 parts of an inert white pigment with low hiding power, and the mixture ground until a fine dispersion of the pigment throughout the base is obtained. This pigmented paste is then blended with 55 parts of a 50% butylated dimethylol urea solution in equal parts of butanol and xylene, 48 parts of the petroleum solvent whose boiling range is 150-260° C. and which is paraffinic and naphthenic in character and which contains less than 20% aromatic hydrocarbon, and 48 parts of a solvent whose boiling range is 135-175° C. and which contains at least 90% aromatic hydrocarbon.

The pigmented base described in the preceding paragraph is converted into a printing paste suitable for printing from engraved copper rollers or plates on to textiles. A 1:6 "light" printing paste is prepared in the following manner:

40 parts of the pigmented paste described in the preceding paragraph are mixed with 20 parts of a solvent with a boiling range of 135-175° C. containing 90%-95% aromatic hydrocarbon and then 220 parts of a reducing emulsion are mixed therein by means of a homogenizing stirrer until a smooth, highly colored water-in-oil printing paste is obtained.

The reducing emulsion used in this example is prepared in two steps. The first step consists of the preparation of a so-called reduction concentrate, which is made by thoroughly homogenizing the following:

50 parts of a 60% solution of a heat converting, fatty acid modified alkyd resin in a solvent with a boiling range of 135-175° C. and containing at least 90% aromatics, 40 parts of a 10% solution of milled rubber in the same solvent, 22.2 parts of a 27% ethyl cellulose solution in the solvent just described, 10 parts of steam distilled pine oil, 3.8 parts of the solvent containing at least 90% aromatic hydrocarbon, 10 parts of sodium lignin sulfonate, 6 parts of 85% ortho phosphoric acid, and 58 parts of water.

The second step or the preparation of the reduction emulsion is conducted as follows:

25 parts of the reduction concentrate described in the preceding paragraph, 40 parts of the 10% milled rubber solution described above, 20 parts of turpentine, 10 parts of steam distilled pine oil, 240 parts of a solvent whose boiling point is between 150 and 207° C. and which is essentially paraffinic or naphthenic in character and which contains less than 25% of aromatic hydrocarbon, 645 parts of water and 20 parts of glacial acetic acid are intimately mixed with a homogenizing stirrer until a creamy water-in-oil type of emulsion is obtained.

If a weaker print than that described above is desired, as for example, a 20 "light" color paste, the following ingredients are mixed thoroughly: 40 parts of the printing emulsion just described (1:6 "light" paste), 82.4 parts of the reducing emulsion just described.

When these color pastes are printed on cellulose fabrics from copper engraved rolls and the prints dried and heat treated one minute at 120° C., clean bright, yellowish orange prints are obtained. If the prints just described are compared with corresponding prints made from the same base and in the same manner except that a petroleum fraction boiling between 135-175° C. and which contains from 90-95% aromatics is used in the preparation of the reducing emulsion to replace the petroleum solvent described, it is found that the prints made following the instructions given in the example are stronger than those obtained when the solvent containing the high aromatic content is employed.

*Example 4*

A green pigmented base is prepared in the manner described in Example 2. The ingredients used in this preparation are as follows:

637 parts of the polymer blend described in the first step of Example 2, 30 parts of tricresyl phosphate, 158 parts of a green pigment (chlorinated phthalocyanine), 113 parts of the inert white pigment described in Examples 2 and 3, 277 parts of the butylated dimethylol urea solution described in the preceding example, 222 parts of the solvent used in Example 3 which was paraffinic in nature and contained less than 20% aromatic hydrocarbons, 221 parts of the solvent described in the preceding example which contained at least 90% aromatic hydrocarbon.

A smooth highly-colored green water-in-oil emulsion is prepared from the pigmented base described in the previous paragraph by adding thereto, with vigorous and intimate stirring using a homogenizing type of stirrer, 600 parts of a petroleum solvent containing at least 90% of aromatic hydrocarbons, 150 parts of turpentine and 600 parts of water.

Printing pastes of the desired strength are prepared by simply mixing the above green emulsion with the required quantity of a reducing emulsion. The reducing emulsion used in this preparation is made in the same manner as that used and described in Example 3. The ingredients, however, are as follows:

3 parts of the reduction concentrate as per Example 3, 25 parts of a petroleum fraction boiling between 150 and 210° C. which is substantially paraffinic and naphthenic in character and containing less than 25% aromatic hydrocarbons, 70 parts of water and 2 parts of glacial acetic acid.

The printing paste when printed on cellulose fabrics from copper engraved rolls or plates produced clean, sharp and bright green designs. When the prints obtained following the teachings of this example are compared with corresponding prints made from the same base and in the same manner but using a reducing emulsion which contained as a solvent a petroleum fraction boiling between 135–175° C. and which contained 90–95% aromatic hydrocarbons in place of the solvent described in Example 4, it will be seen that the prints obtained following the teachings of this example are stronger and brighter than the prints made from the reducing emulsion containing the highly aromatic solvent.

*Example 5*

A smooth blue-colored water-in-oil emulsion is prepared in the following manner:

766 parts of the 60% alkyd resin solution described in the preceding example are thoroughly mixed with 160 parts of a blue pigment (copper phthalocyanine), 80 parts of the inert whitepigment described in preceding examples and the pigments dispersed therein by grinding on a 3-roller ink mill. This pigmented resin base is then blended with 480 parts of the butylated dimethylol urea solution described in the previous examples with 1768 parts of the 10% milled rubber solution described in previous example and then 745 parts of water are emulsified therein by means of a homogenizing type of stirrer. This color emulsion is made into printing pastes at the desired strength by simply stirring the requisite amount of the emulsion with the required quantity of a reducing emulsion which is prepared as follows:

15 parts of the reduction concentrate described in Example 3 is mixed with 125 parts of a petroleum fraction boiling between 150 and 210° C. and which contains 20–25% aromatic, the rest being essentially paraffinic and naphthenic hydrocarbons, 350 parts of water and 10 parts of glacial acetic acid by means of a homogenizing type of stirrer until a creamy emulsion is obtained.

When these emulsions are printed from copper engraved rolls and compared with prints made from the same base but using a reducing emulsion prepared by using in place of the solvent described above a solvent which is a petroleum fraction boiling between 135° and 175° C. and which contains at least 90% aromatic hydrocarbons, it will be found that the prints obtained following the teachings of this example are stronger than those prints obtained when using a reducing emulsion containing the highly aromatic solvent.

In the foregoing examples we have described the immediate emulsification of a pigmented base to produce an emulsion which is of printable consistency, the strength of which can be reduced by suitable dilution with an unpigmented emulsion. It should be understood that it is not necessary to emulsify the base immediately after production. On the contrary, the base keeps well, can be shipped, and is not damaged by changes in temperature over a wide range. This is an important advantage as it is possible for the printer to stock in a small space the necessary amounts of bases for a relatively large production of emulsions and the emulsions can be produced when needed. It is unnecessary to either ship or store the emulsions with their considerable quantity of water and in the case of weaker shades, dilution with unpigmented emulsions. It is an advantage of the present invention that the improved results obtainable with prints by using the non-aromatic solvents of the present invention are enjoyed regardless of whether the emulsion is prepared as soon as the base is formed or whether it is prepared by the printer at the time of printing. None of the commercial advantages of concentrated bases for shipment and storage is lost in order to gain the brighter stronger prints which are producable by the present invention.

While it is an advantage of the present invention that pigmented bases employing these features can be sold and emulsified by the printer, it should be understood that we do not claim here broadly the production of bases or this method of preparing emulsions, but only claim this feature in conjunction with the use of predominantly non-aromatic solvents of the present invention.

In the specification and claims the term "dispersed" and "dispersion" are used to cover heterogeneous finely divided mixtures such as emulsions, suspensions and the like, but do not include true solutions.

In the examples the colors used are in the main pigments, that is to say, colors which are not soluble in the hydrocarbon solvent. This is the preferred form of the invention since many of these pigments have desirable characteristics of fastness and the like, and since it is also possible to use colors which are otherwise not applicable to textile printing because of their lack of affinity for the fibers or the impossibility of applying them thereto by ordinary printing means. The invention, however, is not limited to the use of pigments which is merely a preferred modification. On the contrary, dyestuffs may be used which are soluble either in hydrocarbon solvents or, in some cases water, and which may have affinity for the fiber. In the case of water-soluble dyestuffs, of course unless these dyestuffs unite with the fiber to form a relatively water-insoluble complex, they would not be very fast to washing. Similarly in the case of dyestuffs which are soluble in the hydrocarbon solvents, unless such dyestuffs unite with the fiber, the resulting print may not be entirely fast to dry-cleaning where similar hydrocarbon solvents are used. In the claims the use of the term "color" is intended to cover both dyestuffs which may be soluble in one or other components of the dispersion and pigments which are not soluble therein.

We claim:

1. An emulsion of the water-in-oil type capable of being applied to fabrics, the oil phase thereof being a colored heterogeneous dispersion of at least one water insoluble, organic solvent soluble heat convertible synthetic resin in a volatile predominantly non-aromatic hydrocarbon vehicle and the dispersed phase being aqueous.

2. An emulsion of the water-in-oil type capable of being applied to fabrics, the oil phase thereof being a pigmented heterogeneous dispersion of at least one water insoluble, organic solvent soluble heat convertible synthetic resin in a volatile, predominantly non-aromatic hydrocarbon vehicle and the dispersed phase being aqueous.

3. An emulsion of the water-in-oil type capable of being applied to fabrics, the oil phase thereof being a pigmented heterogeneous dispersion of at least one water insoluble, organic solvent soluble heat convertible oil-modified alkyd resin in a volatile, predominantly non-aromatic hydrocarbon vehicle and the dispersed phase being aqueous.

4. An emulsion of the water-in-oil type capable of being applied to fabrics, the oil phase thereof being a pigmented heterogeneous dispersion of at least one water insoluble, organic solvent soluble heat convertible alkylated amino plastic in a volatile, predominantly non-aromatic hydrocarbon vehicle and the dispersed phase being aqueous.

5. An emulsion of the water-in-oil type capable of being applied to fabrics, the oil phase thereof being a pigmented heterogeneous dispersion of at least one water insoluble, organic solvent soluble heat convertible alkylated urea aldehyde resin in a volatile, predominantly non-aromatic hydrocarbon vehicle and the dispersed phase being aqueous.

6. An emulsion of the water-in-oil type capable of being applied to fabrics, the oil phase thereof being a pigmented heterogeneous dispersion of at least one water insoluble, organic solvent soluble heat convertible alkylated triazine aldehyde resin in a volatile, predominantly non-aromatic hydrocarbon vehicle and the dispersed phase being aqueous.

7. A colored base comprising a pigmented heterogeneous dispersion of at least one water insoluble, organic solvent soluble heat convertible synthetic resin in a volatile, predominantly non-aromatic hydrocarbon vehicle, said dispersion being capable of emulsification with aqueous media to form a uniform water-in-oil emulsion in which the continuous phase is the said dispersion of resin in the hydrocarbon vehicle and the dispersed phase is aqueous.

8. A colored base comprising a pigmented heterogeneous dispersion of at least one water insoluble, organic solvent soluble heat convertible oil-modified alkyd resin in a volatile, predominantly non-aromatic hydrocarbon vehicle, said dispersion being capable of emulsification with aqueous media to form a uniform water-in-oil emulsion in which the continuous phase is the said dispersion of resin in the hydrocarbon vehicle and the dispersed phase is aqueous.

9. A colored base comprising a pigmented heterogeneous dispersion of at least one water insoluble, organic solvent soluble heat convertible alkylated amino plastic in a volatile, predominantly non-aromatic hydrocarbon vehicle, said dispersion being capable of emulsification with aqueous media to form a uniform water-in-oil emulsion in which the continuous phase is the said dispersion of plastic in the hydrocarbon vehicle and the dispersed phase is aqueous.

ROY HERMAN KIENLE.
ALFRED LOUIS PEIKER.